(12) United States Patent
Shurtleff et al.

(10) Patent No.: US 10,523,523 B2
(45) Date of Patent: Dec. 31, 2019

(54) INFOGRAPHIC SEARCH (71) Applicant: Cisco Technology, Inc., San Jose, CA (US)

(72) Inventors: Mark Shurtleff, Hayward, CA (US); Aurimas Songaila, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 287 days.

(21) Appl. No.: 15/170,970

(22) Filed: Jun. 2, 2016

(65) Prior Publication Data

US 2017/0351386 A1 Dec. 7, 2017

(51) Int. Cl.
*H04L 12/24* (2006.01)
*G06F 3/0484* (2013.01)
*G06F 16/242* (2019.01)
*G06F 3/0482* (2013.01)

(52) U.S. Cl.
CPC .......... *H04L 41/22* (2013.01); *G06F 3/04847* (2013.01); *G06F 16/2428* (2019.01); *H04L 41/0853* (2013.01); *G06F 3/0482* (2013.01)

(58) Field of Classification Search
CPC ............... G06F 3/0482; G06F 3/04847; G06F 16/2428; H04L 41/22; H04L 41/0853
See application file for complete search history.

(56) References Cited

U.S. PATENT DOCUMENTS

| | | | | |
|---|---|---|---|---|
| 8,024,651 B1* | 9/2011 | Error | ................. | G06F 17/30994 715/212 |
| 9,003,023 B2 | 4/2015 | Crank et al. | | |
| 9,852,470 B1* | 12/2017 | Kunz | .................... | G06Q 40/02 |
| 2005/0251510 A1* | 11/2005 | Billingsley | ........... | G06F 16/951 |
| 2006/0218533 A1* | 9/2006 | Koduru | ............... | G06F 11/3447 717/124 |
| 2014/0173478 A1* | 6/2014 | Krane | ................. | G06F 3/04847 715/765 |
| 2015/0128056 A1 | 5/2015 | Rizzi et al. | | |
| 2015/0186338 A1* | 7/2015 | Mirra | ..................... | G06Q 40/06 715/210 |

(Continued)

OTHER PUBLICATIONS

Amazon Screenshots; Feb. 17, 2016; available on the web at www.amazon.com.

(Continued)

*Primary Examiner* — Sherrod L Keaton
(74) *Attorney, Agent, or Firm* — Polsinelli PC (57) ABSTRACT

In one embodiment, a method includes receiving input data from at least one input device, preparing a user interface screen including a search filter area and a search results area, the search filter area including graphical filter tools including selectable sections, each selectable section being associated with a filter criteria for filtering a data set including data items, each selectable section having a size indicative of a number of the data items satisfying the filter criteria, interpreting the input data to include selecting a first selectable section of a first graphical filter tool and a second selectable section of a second graphical filter tool, filtering the data set based on the filter criteria of the first selectable section and the second selectable section, and updating the search results area of the user interface screen based on the filtered data set.

7 Claims, 8 Drawing Sheets

(56) References Cited

U.S. PATENT DOCUMENTS

2017/0122773 A1* 5/2017 Ho .................. G01D 4/002

OTHER PUBLICATIONS

Thomson search graphics; Feb. 17, 2016.
Costco; Feb. 17, 2016; available on the web at: http://www.costco.com/refrigerators.html.
Screen Shots from Patbase Database; Feb. 17, 2016.
SAS(R) 9.4 Graph Template Language: User's Guide, Jul. 1, 2015, Fourth Edition: About Drill-Down Graphs; available on the web at: http://support.sas.com/documentation/cdl/en/grstatug/67914/HTML/default/viewer. htm#n0sd8awfx45rttn1s5othp5h2wp4.htm.
Clips from television program "Supergirl" season 01 episode 09 timestamp 21:59.
Brath, Richard, "Multi-attribute glyphs on Venn and Euler diagrams to represent data and aid visual decoding"; in 3rd International Workshop on Euler Diagrams, pp. 122. Jul. 2, 2012.
Jetter, Hans-Christian et al, "Materializing the query with facet-streams: a hybrid surface for collaborative search on tabletops"; in Proceedings of the SIGCHI Conference on Human Factors in Computing Systems (CHI'11). ACM, New York, NY, USA, May 7, 2011; pp. 3013-3022.
McCullough, Tom; INTERWORKS: The Tableau Cookbook: Donut Charts, Mar. 6, 2014; available on the web at: https://www.interworks.com/blog/tmccullough/2014/03/06/tableau-cookbook-donut-charts.
Otjacques, Benoit et al; "Concentri Sliders to Display Partial Satisfaction of Query Criteria", in Information Visualisation (IV), 2011 15th International Conference on, pp. 59-64, IEEE, Jul. 13, 2011.
Spoerri, Anselm et al; "InfoCrystal: a visual tool for information retrieval & management"; in Proc of the second int conference on Information and knowledge management; pp. 11-20, Nov. 1, 1993; ACM New York, NY, USA ©1993; Bharat Bhargava, Tim Finin, and Yelena Yesha (Eds.)
Kepo-ing Zz85; Visualising Disk Space; Nov. 11, 2008; available on the web at: http://www.lab4games.net/zz85/blog/2008/11/11/visualising-disk-space/.

* cited by examiner

INFOGRAPHIC SEARCH

TECHNICAL FIELD

The present disclosure generally relates to search engine systems.

BACKGROUND

Network management systems require configuration of many hardware devices (e.g., switches, routers, access points, remote physical layer (PHY) devices (RPDs)). These devices have numerous characteristics, for example, but not limited to, hardware configuration, operating system, applications and state. Network Managers may want to identify a common set of devices based on specific criteria from a data set. It may be time consuming and tedious to create sets based on textual "scripts".

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment of the present disclosure, a method including receiving input data from at least one input device, preparing a user interface screen for output to a display device, the user interface screen including a search filter area and a search results area, the search filter area including a plurality of graphical filter tools, each one graphical filter tool of the plurality of graphical filter tools including a plurality of selectable sections, each one selectable section of the plurality of selectable sections being associated with a filter criteria for filtering a data set including a plurality of data items, each one selectable section of the plurality of selectable sections having a size indicative of a number of the plurality of data items satisfying the filter criteria associated with the one selectable section, interpreting the input data to include selecting a first selectable section of the plurality of selectable sections of a first graphical filter tool of the plurality of graphical filter tools, and a second selectable section of the plurality of selectable sections of a second graphical filter tool of the plurality of graphical filter tools, filtering the data set based on the filter criteria of the first selectable section and the second selectable section, and updating the search results area of the user interface screen based on the filtered data set.

Detailed Description

Figure 1:
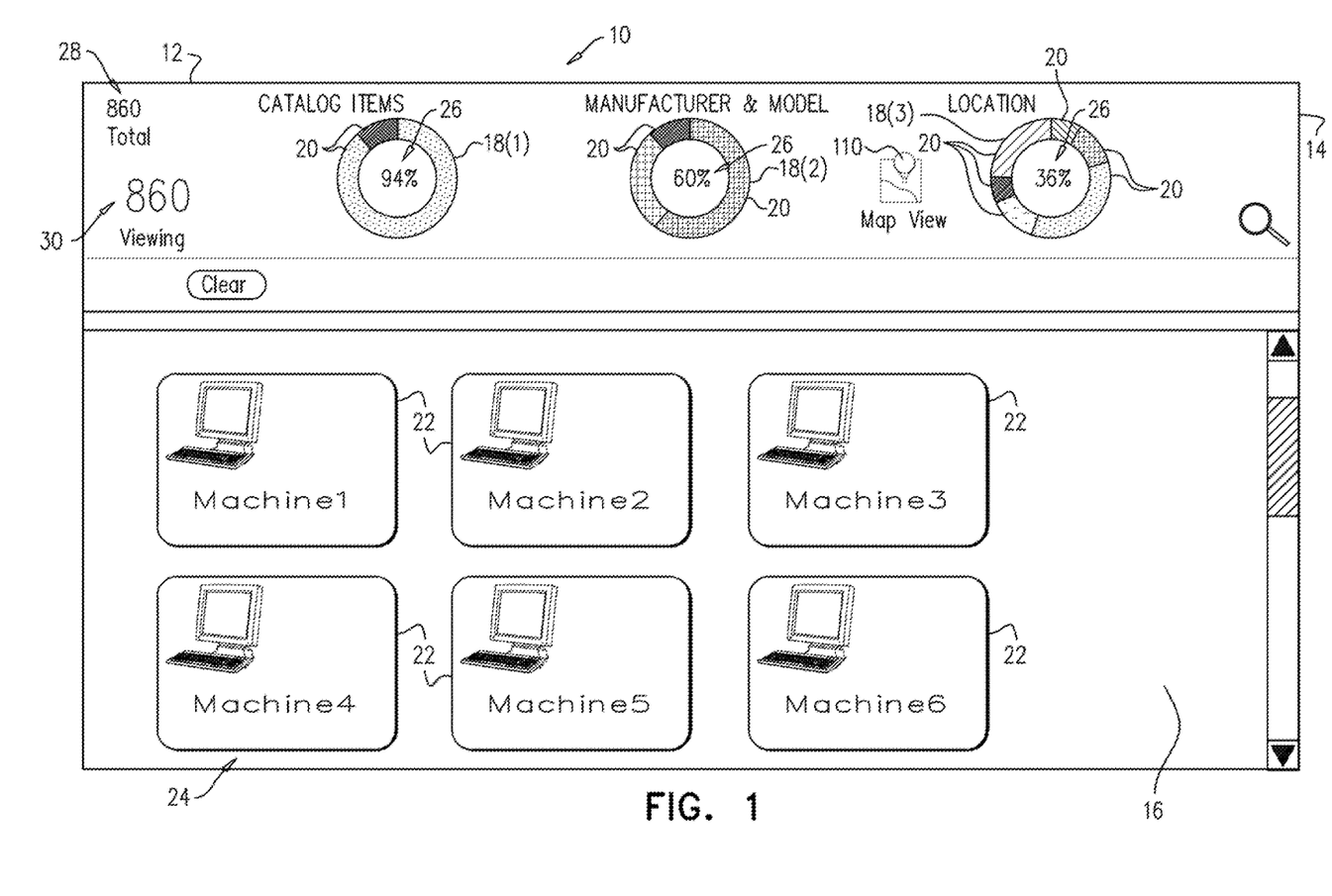
FIG. 1 is a view of a user interface screen prepared by an infographic search engine system constructed and operative in accordance with an embodiment of the present disclosure.

Reference is now made to FIG. 1, which is a view of a user interface screen 12 prepared by an infographic search engine system 10 constructed and operative in accordance with an embodiment of the present disclosure. The infographic search engine system 10 includes preparing the user interface screen 12 including a search filter area 14 and a search results area 16. The search filter area 14 includes a plurality of circular shape filter tools 18 or widgets. Each circular shape filter tool 18 includes a plurality of selectable sectors 20. Each selectable sector 20 is associated with a filter criteria for filtering a data set 24 including a plurality of data items 22. Hovering over any of the selectable sectors 20, for example, with a cursor, may reveal a description associated with the filter criteria and optionally a number of data items having that filter criteria. Each selectable sector 20 has an angular dimension indicative of a number of the data items 22 satisfying the filter criteria associated with that selectable sector 20. The selectable sectors 20 of each circular shape filter tool 18 are proportioned so that the angular dimension of each selectable sector 20 is sized according to the number of data items 22 satisfying the filter criteria of that selectable sector 20 as a proportion of the total number of data items 22 fulfilling the filter criteria of any selectable sector 20 in that circular shape filter tool 18. Each selectable sector 20 may be an annular sector of an annular ring or a circular sector of a circle, by way of example only. Therefore, the selectable sectors 20 of one of the circular shape filter tools 18 may resemble a donut chart or a pie chart, by way of example only. Each selectable sector 20 therefore enables selecting a filter criteria as well as providing information regarding the number of data items 22 satisfying the filter criteria (as a proportion of a total) via the angular dimension of the selectable sector 20.

Each circular shape filter tool 18 may include, disposed therein, a size 26 of a largest sector 20 in the circular shape filter tool 18 expressed as a percentage of the total size of all the selectable sectors 20 in the circular shape filter tool 18.

Selection of the selectable sectors 20 may drive search tags described in more detail below with reference to FIGS. 2-11. In turn, the search tags may drive filtering the data items 22 displayed in the search results area 16 according to the selected tags, for example, but not limited to, performing an AND Boolean operation using the filter criteria of the search tags. The filtering may be performed using any suitable criteria, for example, but not limited to performing an OR Boolean operation using the filter criteria of the search tags. The donut or pie charts may also provide drill down functionality, described in more detail with reference to FIGS. 6-8. Selecting a map button 110 displays a map in addition to, or instead of the search results area 16, showing a physical location of each of the filtered data items 22.

In the example of FIG. 1, the user interface screen 12 provides a filtering tool for network configuration. The top level circular shape filter tools (widgets) 18 display information about Remote Physical Layer (PHY) Devices distributed over a wide geography that may need to be configured for example, across several states or within a city. The circular shape filter tools 18 shown in FIG. 1 are labeled 18(1). 18(2) and 18(3) for the sake of convenience and are shown as donut shaped widgets. The circular shape filter tool 18(1) of FIG. 1, by way of example, provides information about, and allows filtering based on, a state of catalog packages in the library (whether the packages are deployed (one filter criteria) or not (another filter criteria)). Using the circular shape filter tool 18(1) to drill down to a sub-level (shown in FIGS. 6-8), displays a sub-level circular shape filter tool with the names of the deployed packages, by way of example only. The circular shape filter tool 18(2) provides information about, and allows filtering based on, manufacturer. Drilling down using the circular shape filter tool 18(2) may show two charts (shown in FIG. 10), one to filter by operating system and one to filter by model number, by way of example only. The circular shape filter tool 18(3) provides information and allows filtering based on location. Drilling down using the circular shape filter tool 18(3) may include sub-locations such as cities or zip codes. It may be possible to provide multiple levels of drill down depending on the hierarchical structure of the search filters used in a particular implementation.

The user interface screen 12 may also include a total number 28 of the data items 22 in the data set 24 and a number 30 of data items 22 available for "viewing" in the search results area 16 according to a filtered data set filtered according to selected filters.

Selecting any of the data items 22 in the search results area 16 may result in expanding the selected data item 22 to show more information about the selected data item 22. Alternatively, selecting any of the data items 22 may result in a new window opening, showing more information about the selected data item 22.

Filtering the data items 22 may be a first step in a configuration workflow task, for example, performing actions on one or more of the filtered data items 22 in the search results area 16.

The infographic search engine system 10 has been described herein by way of example of managing a network of computing devices. However, it will be appreciated that infographic search engine system 10 may be used to filter any suitable data set for example, but not limited to, inventory in a warehouse or patents.

Reference is now made to FIGS. 2-11, which are views of the search filter area 14 of the infographic search engine system 10 of FIG. 1 showing various exemplary states and options of the search filter area 14.

Figure 2:
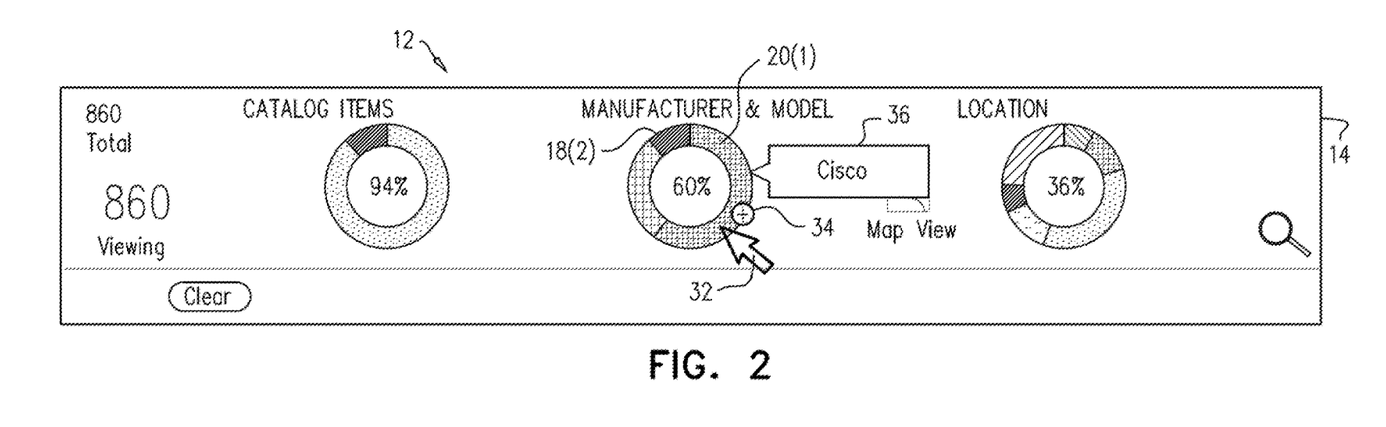
FIGS. 2-11 are views of a search filter area of the infographic search engine system of FIG. 1 showing various exemplary states and options of the search filter area.

FIG. 2 shows a cursor 32 hovering over a sector 20(1) of the circular shape filter tool 18(2). In response to the hovering over the sector 20(1), the user interface screen 12 is updated to include: a symbol 34 (for example, but not limited to a plus symbol in a circle) which is disposed on or adjacent to the selectable sector 20(1); and a description 36 of the filter criteria associated with the selectable sector 20(1); and optionally a number (not shown) of the data items 22 (FIG. 1) satisfying the filter criteria associated with the selectable sector 20(1).

Figure 3:
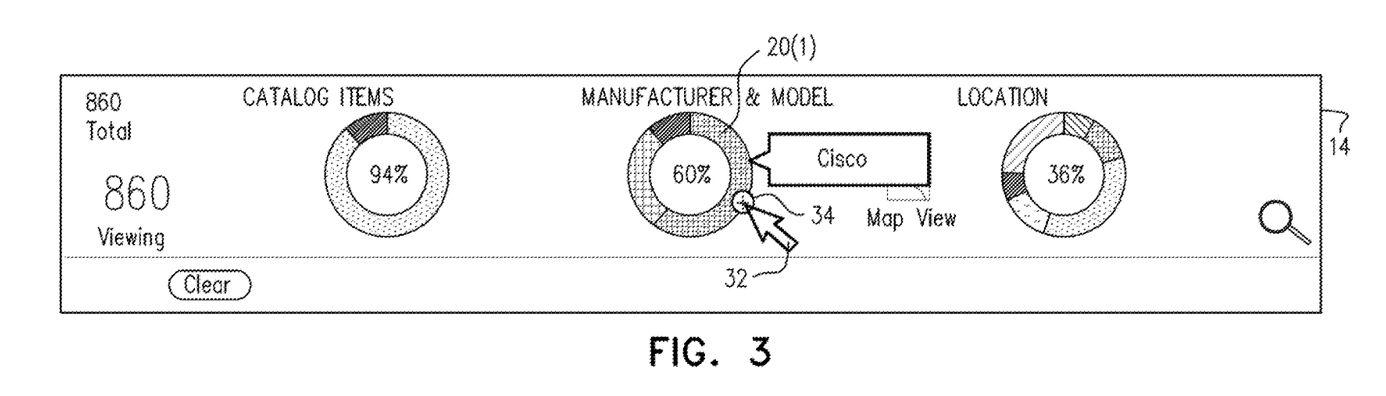

FIG. 3 shows the cursor 32 over the symbol 34. The symbol 34 may be selected by the user in order to add the filter criteria associated with the selectable sector 20(1) to filter criteria used to filter the data set 24 (FIG. 1).

Figure 4:
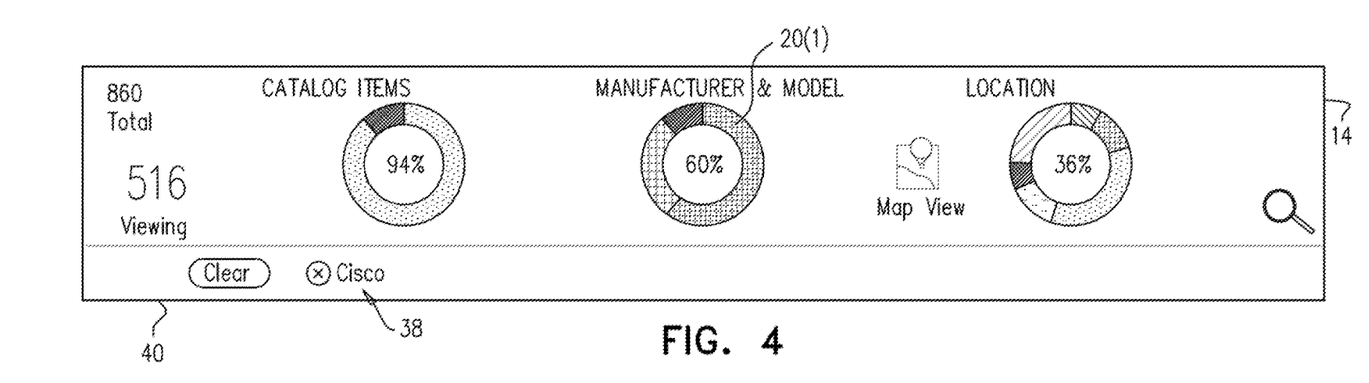

FIG. 4 shows that in response to the user selecting the symbol 34 (FIG. 3), a search tag 38 (e.g., "Cisco") for the filter criteria associated with the selectable sector 20(1) is added to the search filter area 14 in a search tag bar 40. In response to the filter criteria selection, the data set 24 (FIG. 1) is filtered based on the selected filter criteria and the search results area 16 (FIG. 1) is updated based on the filtered data set.

Figure 5:
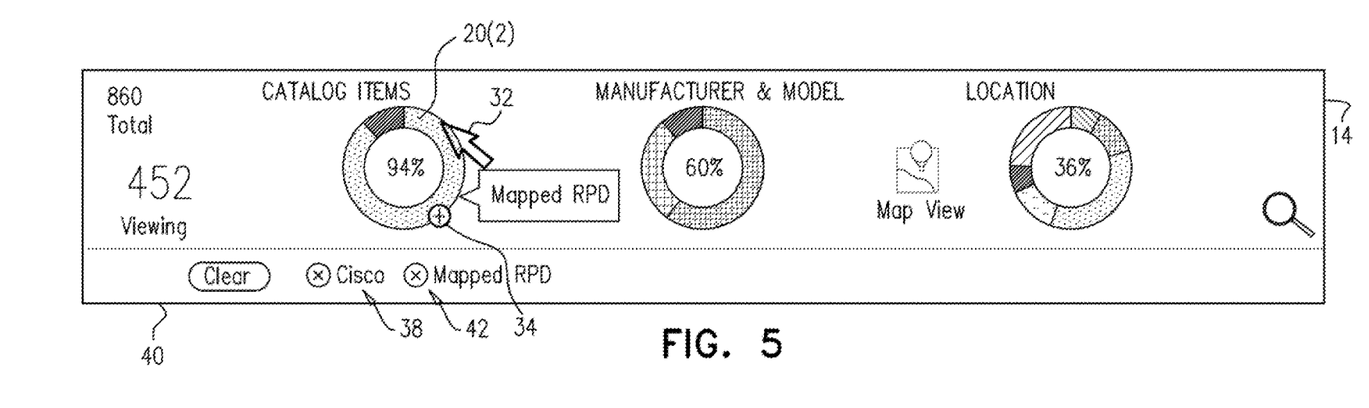

FIG. 5 shows that another search tag 42 has previously been added to the search tag bar 40 based on the selection of another filter criteria by selecting the symbol 34 of a selectable sector 20(2). In response to adding the new filter criteria (e.g. "Mapped RPD") of the search tag 42, the data set 24 (FIG. 1) is filtered based on the new filter criteria of the search tag 42 in addition to the filter criteria of the search tag 38, for example based on a Boolean AND or OR operation. The Boolean operation may be fixed as either AND or OR or the Boolean operation may be user selectable via an appropriate option or selection button (not shown). The search results area 16 (FIG. 1) is updated to reflect the newly filtered data set. FIG. 5 also shows the user placing the cursor 32 over the selectable sector 20(2), but not over the symbol 34 of the selectable sector 20(2). The user then selects the selectable sector 20(2), but not the symbol 34 of the selectable sector 20(2). Selecting the selectable sector 20(2) is interpreted as a drill down request from the selectable sector 20(2).

Figure 6:
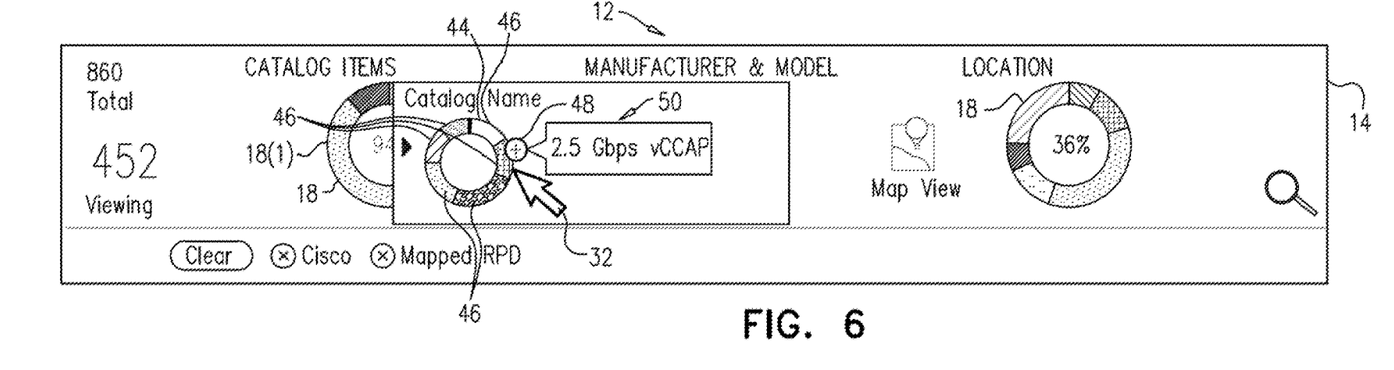

FIG. 6 shows the search filter area 14 of the user interface screen 12 being updated, in response to the drill down request, to include a sub-level circular shape filter tool 44 including a plurality of sub-level selectable sectors 46. Each sub-level selectable sector 46 is associated with a filter criteria associated with the selectable sector 20(2) (FIG. 5) of the circular shape filter tool 18(1). Each sub-level selectable sector 46 has an angular dimension indicative of a number of the data items 22 (FIG. 1) satisfying the filter criteria associated with the sub-level selectable sector 46. The sub-level circular shape filter tool 44 has substantially the same form as the circular shape filter tools 18, e.g. donut chart or pie chart form. The sub-level circular shape filter tool 44 may have a smaller radius than the circular shape filter tools 18. The sub-level circular shape filter tool 44 has similar functionality to the circular shape filter tools 18, in that hovering over one of the sub-level selectable sectors 46 with the cursor 32 may reveal one or more of the following: a symbol 48 for selecting a search tag for the hovered over sector 46; a description 50 of the filter criteria of the hovered over sector 46; and a number (not shown) of the data items 22 associated with the hovered over sector. Additionally, drilling down from the sub-level selectable sectors 46 may be possible to one or more sub-levels of the sub-level circular shape filter tools 44. Therefore, it can be seen that the widgets 18, 44 may be hierarchical whereby selecting one of the selectable sectors 20 (FIG. 1), 46 may "drill" into a lower level of detail for that sector 20, 46 allowing users to construct specific queries via a visual "point and click" method.

Figure 7:
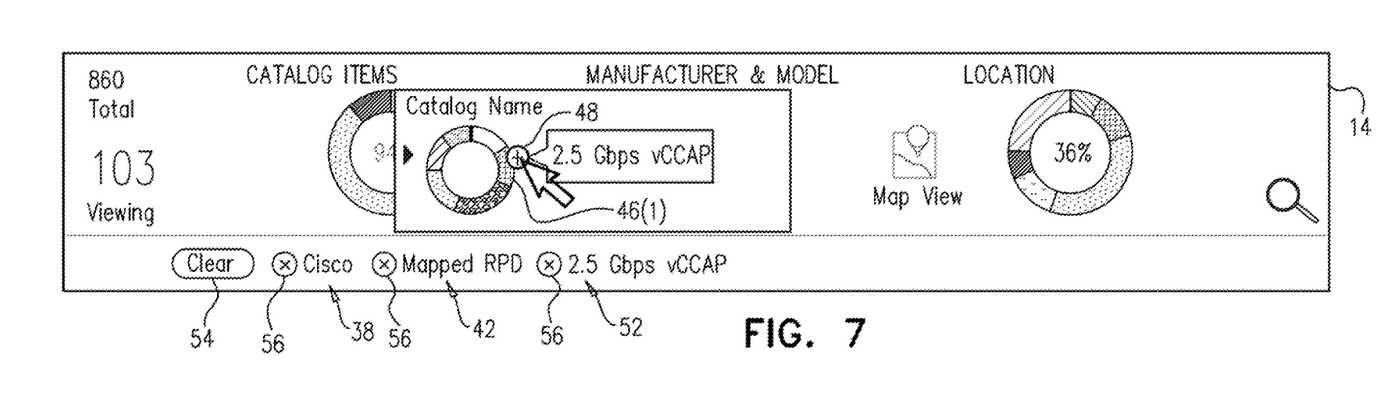

FIG. 7 shows the user adding a search tag 52 by selecting the symbol 48 of the sub-level selectable sector 46(1). The search tags 38, 42, 52 may be removed individually by selecting a symbol 56 next to the relevant search tag 38, 42, 52 or by selecting a clear button 54 to clear all the search tags 38, 42, 52 simultaneously.

Figure 8:
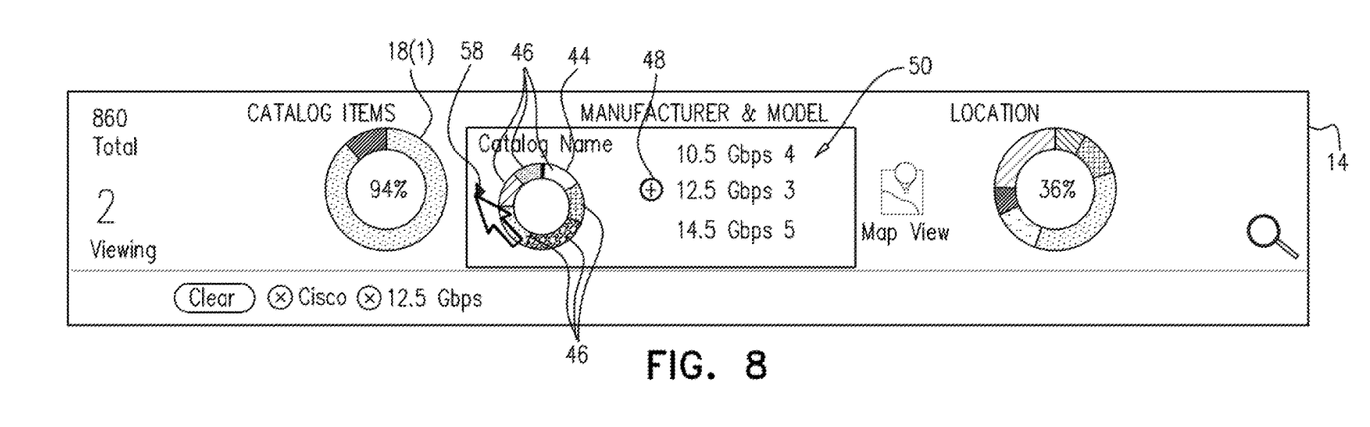
Figure 9:
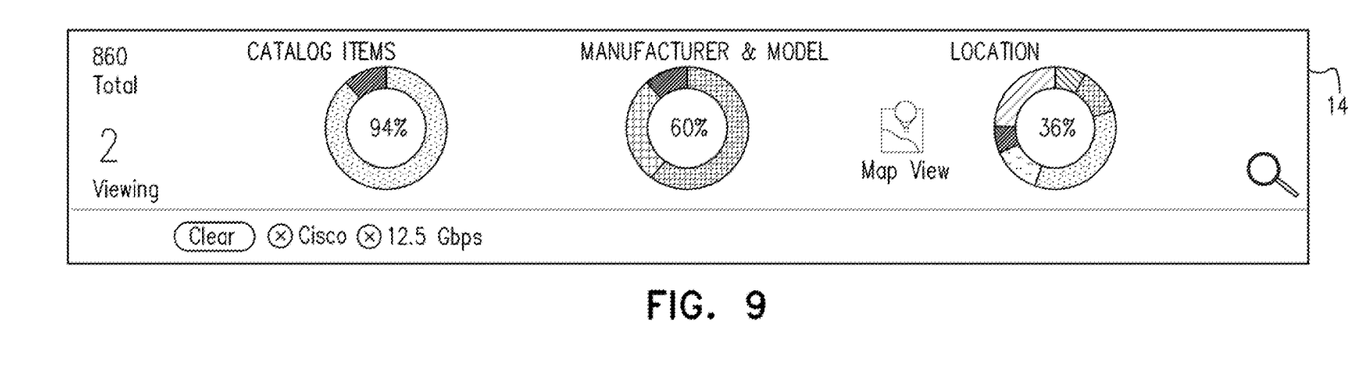

In FIG. 8, the sub-level circular shape filter tool 44 does not cover over the circular shape filter tool 18(1) even partially. Additionally, in FIG. 8, the descriptions 50 of the sub-level selectable sectors 46 and the symbol 48 are shown in a list adjacent to the sub-level circular shape filter tool 44. Selecting a symbol 58 collapses the sub-level circular shape filter tool 44 resulting in the search filter area 14 as shown in FIG. 9.

Figure 10:
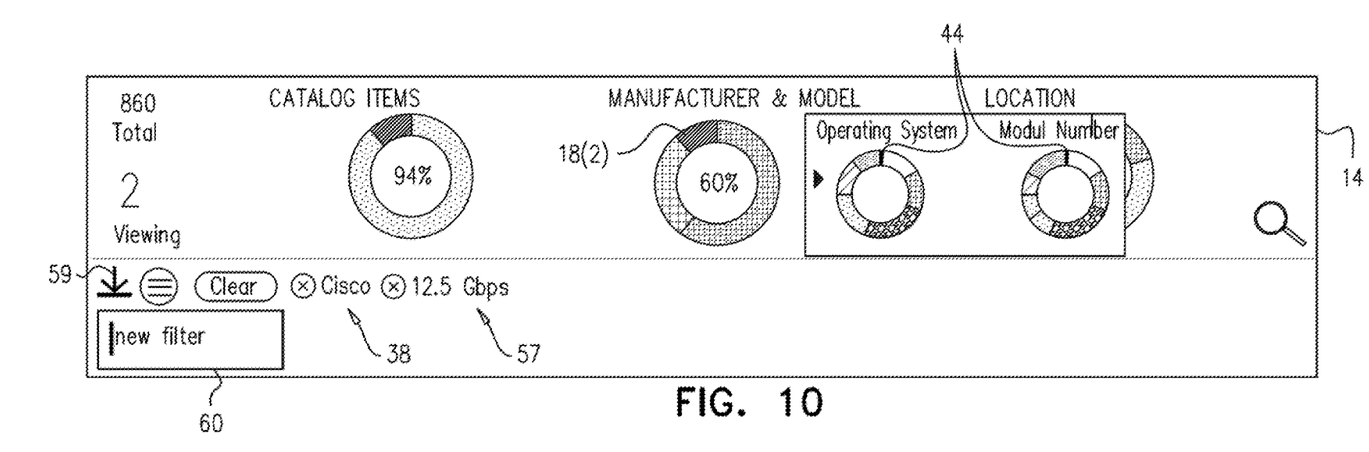

FIG. 10 shows two sub-level circular shape filter tools 44 extending from the circular shape filter tool 18(2) after a drill down request. One of the sub-level circular shape filter tools 44 provides filtering options for one filter criteria (e.g., operating system) and the other sub-level circular shape filter tool 44 provides filtering options for another filtering criteria (e.g., model number). Tag 38 and a tag 57 may be saved as a tag set by selecting an icon 59 which reveals a tag set naming box 60. A name can then be assigned to that tag set, for example, but not limited to, "Fast Cisco", as shown later in FIG. 11. In such a way any set of selected tags may be saved for later retrieval as described below in more detail with reference to FIG. 11. It will be appreciated that any number of tags may be saved in a tag set for later retrieval.

Figure 11:
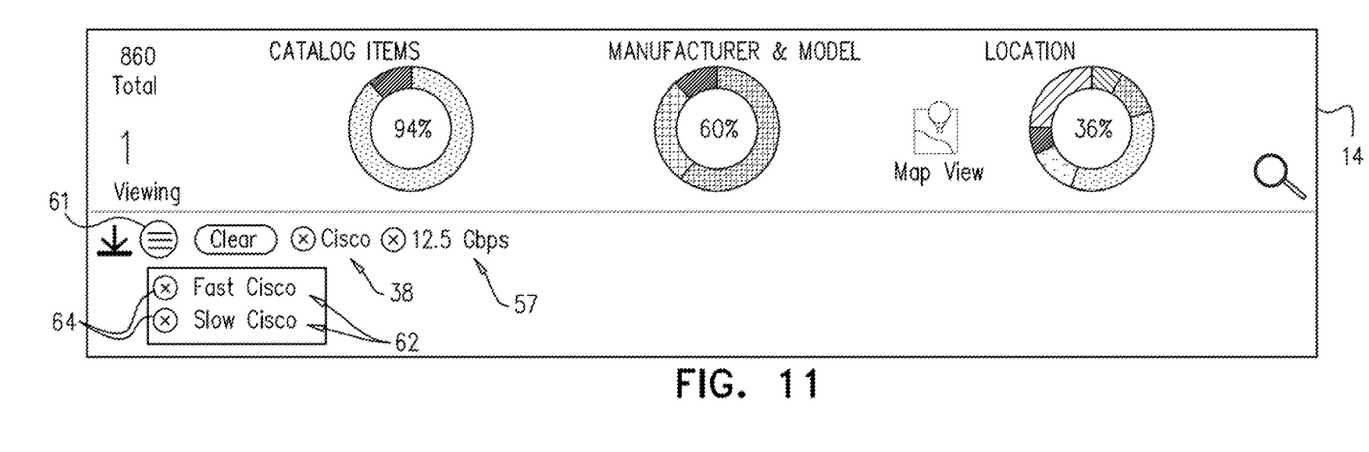

FIG. 11 shows two saved tag sets 62 that have been saved using the filter creation box 60 of FIG. 10. The list of saved tag sets 62 may be revealed by selecting an icon 61. One of the saved tag sets 62 may be removed from the list of saved tag sets 62 by selecting a symbol 64 next to that saved tag set 62. Furthermore, one of the saved tag sets 62 may be selected by selecting that saved tag set 62 from the list of saved tag sets 62 (for example, by clicking or double clicking on the saved tag set 62). In the example of FIG. 11, the saved tag set "Fast Cisco" was selected by the user thereby retrieving the tags 38, 57 and filtering the data set 24 (FIG. 1) according to the filter criteria of tags 38, 57.

Figure 12:
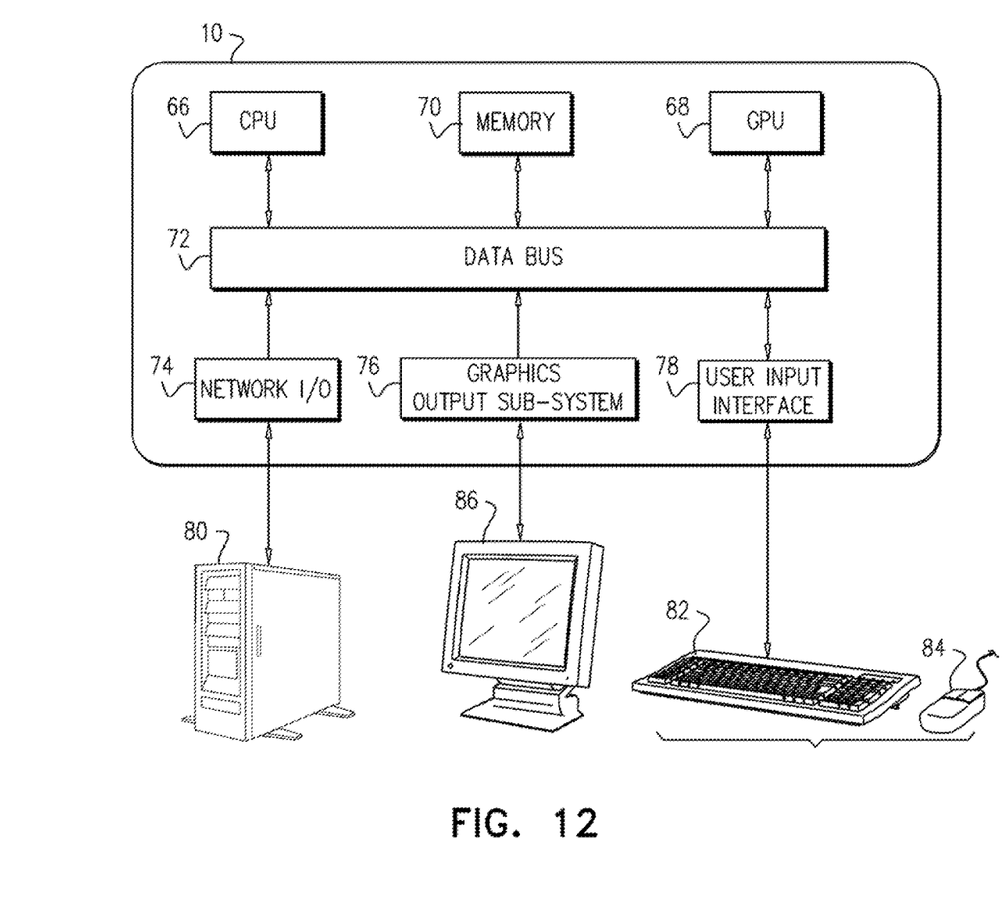
FIG. 12 is a partly pictorial, part block diagram view of the infographic search engine system of FIG. 1.

Reference is now made to FIG. 12, which is a partly pictorial, part block diagram view of the infographic search engine system 10 of FIG. 1. The system 10 includes a central processing unit (CPU) 66, a graphics processing unit (GPU) 68, a memory 70, a data bus 72, a network input/output interface 74, a graphics output sub-system 76 and a user input interface 78. The memory 70 is operative to store data used by the central processing unit 66 and the graphics processing unit 68. The data bus 72 is operative to transfer data between the various elements of the system 10. The network input/output interface 74 is operative to receive data from a server 80. The server 80 may store data about the data items 22 (FIG. 1), by way of example only. The network input/output interface may be a wired and/or wireless network interface.

The user input interface 78 is operative to receive input data from at least one input device, for example, but not limited to, a keyboard 82, a mouse 84 and/or a touchscreen (not shown). The input data may indicate a screen position (e.g., a screen position of a cursor or a finger or a stylus) and/or a mouse click or an equivalent selection command and/or keyboard input, by way of example only. When the system 10 is implemented in a smart phone, the user input interface 78 may receive the input data from a touchscreen of the smart phone.

The central processing unit 66 is operative to prepare the user interface screen 12 (FIG. 1) for output to a display device 86. The graphics processing unit 68, may also perform graphics processing of the user interface screen 12 including customizing the user interface screen 12 according to specifications of the display device 86. The graphics output sub-system 76 is operative to output the user interface screen 12 to the display device 86. The display device 86 may be implemented as a stand-alone monitor as shown in FIG. 12, as a display integrated with the system 10 typically incorporating a touchscreen (for example, when the system 10 is implemented in a smart phone), or as a projector and screen arrangement, by way of example only. The graphics processing unit 68 may be implemented in the central processing unit 66.

The central processing unit 66 is also operative to receive the input data from the user input interface 78 and interpret the input data, for example, based on a screen position (e.g., a screen position of a cursor or a finger or a stylus). It will be appreciated that the above described functions of the central processing unit 66 may be implemented using a suitably coded software application running on the central processing unit 66.

Figure 13:
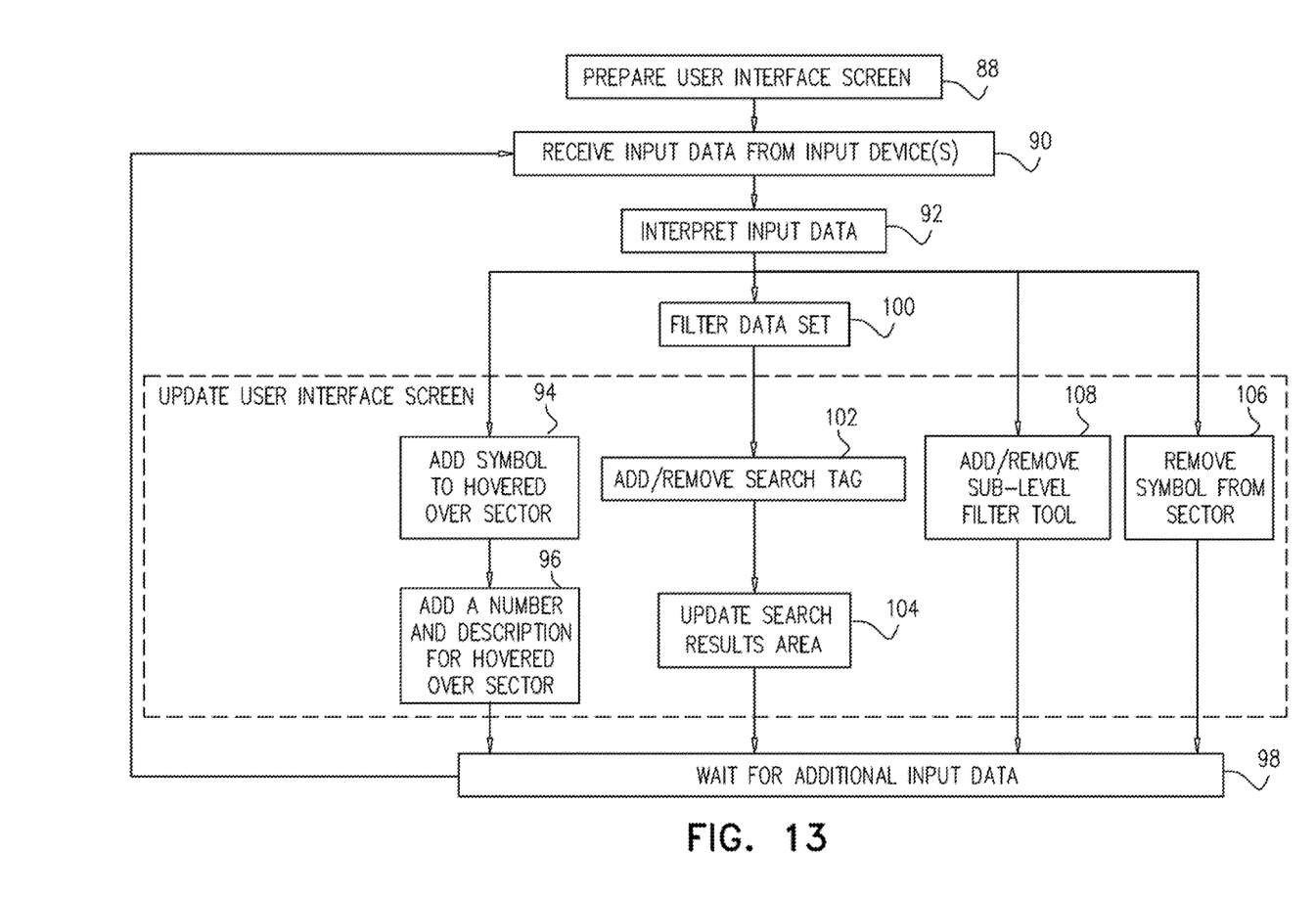
FIG. 13 is a flow chart showing exemplary steps in a method of operation of the infographic search engine system of FIG. 1.

Reference is now made to FIG. 13, which is a flow chart showing exemplary steps in a method of operation of the infographic search engine system 10 of FIG. 1. Reference is also made to FIG. 12. The central processing unit 66 is operative to prepare the user interface screen 12 of FIG. 1 (block 88). The central processing unit 66 is operative to dispose in each circular shape filter tool 18 (FIG. 1) a size 26 of the largest sector 20 (FIG. 1) of the selectable sectors 20 in that circular shape filter tool 18 expressed as a percentage. The central processing unit 66 is operative to receive the input data from input devices via the user input interface 78 (block 90). The central processing unit 66 is operative to interpret the input data and perform various tasks according to the interpretation of the input data (block 92).

The central processing unit 66 may interpret the input data to include hovering over the selectable sector 20(1) (FIG. 2). In response to the hovering, the central processing unit 66 is operative to update the user interface screen 12 (FIG. 2) to include at least one of the following: the symbol 34 (FIG. 2) which is disposed on or adjacent to the selectable sector 20(1) (block 94); the number of the data items 22 (FIG. 1) satisfying the filter criteria associated with the selectable sector 20(1); and/or the description 36 (FIG. 2) of the filter criteria associated with the selectable sector 20(1) (block 96). The central processing unit 66 is then operative to wait for additional input data (block 98) and then continues with steps 90 and 92 again.

When hovering over the selectable sector 20(1) ceases, as detected by the central processing unit 66, the symbol 34, the description 36 and the number of the data items 22 (FIG. 1) satisfying the filter criteria associated with the selectable sector 20(1) are generally removed from the user interface screen 12 by the central processing unit 66 (block 106). The central processing unit 66 is then operative to wait for additional input data (block 98) and then continues with steps 90 and 92 again.

The central processing unit 66 may interpret the input data to include selecting: the selectable sector 20(1) (FIG. 3) and/or the selectable sector 20(2) (FIG. 5). The central processing unit 66 is operative to filter the data set 24 (FIG. 1) based on the filter criteria of the selectable sector 20(1) and/or the selectable sector 20(2), as appropriate (block 100). In particular, the central processing unit 66 may interpret the input data to include performing a selection operation in proximity to the symbol 32 (FIG. 3) and in response to the selection operation, the central processing unit 66 is operative to filter the data set 24 based on the filter criteria of the selectable sector 20(1). Similarly, the central processing unit 66 may interpret the input data to include performing a selection operation in proximity to the symbol 34 (FIG. 5) and in response to the selection operation, the central processing unit 66 is operative to filter the data set 24 based on the filter criteria of the selectable sector 20(2) (FIG. 5), or any other selectable sector 20 (FIG. 1). The central processing unit 66 is operative to update the user interface screen 12 by adding the search tag 38 (FIG. 5) for the filter criteria of the selectable sector 20(1) and/or the search tag 42 (FIG. 5) for the filter criteria of the selectable sector 20(2) to the search tag bar 40 (FIG. 5) of the user interface screen 14 and more search tags as selected by the user. Search tags may also be removed as described above with reference to FIG. 7 (block 102). The central processing unit 66 is operative to update the search results area 16 (FIG. 1) of the user interface screen 14 based on the filtered data set (block 104). The central processing unit 66 is then operative to wait for additional input data (block 98) and then continues with steps 90 and 92 again.

The central processing unit 66 may interpret the input data to include a drill down request from the selectable sector 20(1) (FIG. 2) of the circular shape filter tool 18(2) (FIG. 1). Based on interpreting the drill down request, the central processing unit 66 is operative to update the user interface screen 12 (FIG. 1) to include at least one sub-level circular shape filter tool 44 (FIG. 6) including a plurality of sub-level selectable sectors 46 (FIG. 6). Each sub-level selectable sector 46 is associated with a filter criteria associated with the selectable sector 20(1). Each sub-level selectable sector 46 has an angular dimension indicative of the number of the data items 22 (FIG. 1) satisfying the filter criteria associated with the sub-level selectable sector 46 (block 108). The central processing unit 66 may be operative to update the user interface screen 12 to simultaneously include the sub-level circular shape filter tool(s) 44 and the circular shape filter tools 18 (FIG. 1). The sub-level circular shape filter tool(s) 44 may be removed by selecting a suitable symbol, e.g., the symbol 58 (FIG. 8) or by some other suitable action or keystroke(s), by way of example only. The central processing unit 66 is then operative to wait for additional input data (block 98) and then continues with steps 90 and 92 again.

It will be appreciated that the infographic search engine system 10 may be generalized as follows. The circular shape filter tools 18 and sub-level circular shape filter tools 44 may be generalized as graphical filter tools of any suitable shape, for example, but not limited to, square, triangular, bar chart etc. The selectable sectors 20, 46 may be generalized as a selectable sections of any suitable shape, e.g., rectangular, triangular etc. The angular dimension of any of the sectors 20, 46 may be generalized as a size of a selectable section wherein a size of a selectable section is indicative of a number of data items satisfying the filter criteria associated with that selectable section.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A method comprising:
displaying a user interface screen on a display device, the user interface screen including a search filter area and a search results area, the search filter area including a plurality of graphical filter tools, each one graphical filter tool of the plurality of graphical filter tools including a plurality of selectable sections, each one selectable section of the plurality of selectable sections being associated with a filter criteria for filtering a data set including a plurality of data items, each one selectable section of the plurality of selectable sections having a size indicative of a number of the plurality of data items satisfying the filter criteria associated with the one selectable section; first engaging a displayed cursor with a first selectable section of the plurality of selectable sections of a first graphical filter tool of the plurality of graphical filter tools; in response to the first engaging: first altering display of the first selectable section to provide a first selectable symbol at a location on the first selectable section that is distinct from the location that the cursor engaged the first selectable section; and displaying on the displayed user interface screen a description of a first filtering criteria represented by the first selectable section; first selecting with the displayed cursor the first selectable symbol; adding, in response to the first selecting, the first filtering criteria to a filter list; second engaging the displayed cursor with a second selectable section of the plurality of selectable sections of a second graphical filter tool of the plurality of graphical filter tools; second altering, in response to the second engaging, display of second selectable section to provide a second selectable symbol at a location on the second selectable section that is distinct from the location that the cursor engaged the second selectable section; second selecting with the displayed cursor the second selectable symbol; displaying on the displayed user interface screen, along with at least part of the first graphical filter tool, a new graphic filtering tool representing a plurality of sub-electable sections representing a subset of filtering options from the second selectable section; second engaging the displayed cursor with a first sub-electable section of the plurality of sub-electable sections; in response to the second engaging: altering display of the first sub-electable section to provide a second selectable symbol at a location on the first sub-electable section that is distinct from the location that the cursor engaged the first sub-electable section; displaying on the displayed user interface screen a description of a second filtering criteria represented by the first sub-electable section; second selecting with the displayed cursor the second selectable symbol; adding, in response to the second selecting, the second filtering criteria to the filter list; filtering the data set based on the filter list, the filter list including at least the first selectable section and the first sub-electable section;
presenting a selectable map icon m the search filter area to present the search results in a map view area, the map view area displaying a map of the search results; and updating the search results area and the map view area of the user interface screen based on the filtered data set; wherein each one of the plurality of graphical filter tools includes a ring shape filter tool surrounding a display field to display an angular dimension; and wherein the first altering display of the first selectable section provides the first selectable symbol on an arc portion of the first selectable section.

2. The method according to claim 1, further comprising: in response to the first engaging, updating the user interface screen to include the number of the plurality of data items satisfying the filter criteria associated with the first selectable section.

3. The method according to claim 1, further comprising disposing in each one graphical filter tool of the plurality of graphical filter tools a size of a largest section of the plurality of selectable sections in the one graphical filter tool expressed as a percentage.

4. A system comprising:
a user input interface to receive input data from at least one input device; a central processing unit to:
displaying a user interface screen on a display device, the user interface screen including a search filter area and a search results area, the search filter area including a plurality of graphical filter tools, each one graphical filter tool of the plurality of graphical filter tools including a plurality of selectable sections, each one selectable section of the plurality of selectable sections being associated with a filter-criteria for filtering a data set including a plurality of data items, each one selectable section of the plurality of selectable sections having a size indicative of a number of the plurality of data items satisfying the filter criteria associated with the one selectable section;
first engage a displayed cursor with a first selectable section of the plurality of selectable sections of a first graphical filter tool of the plurality of graphical filter tools; in response to the first engage:
first alter display of the first selectable section to provide a first selectable symbol at a location on the first selectable section that is distinct from the location that the cursor engaged the first selectable section; and display on the displayed user interface screen a description of a first filtering criteria represented by the first selectable section; first select with the displayed cursor the first-selectable symbol; add, m response to the first select, the first filtering criteria to a filter list; second engage the displayed cursor with a second selectable section of the plurality of selectable sections of a second graphical filter tool of the plurality of graphical filter tools; second alter, in response to the second engaging, display of second selectable section to provide a second selectable symbol at a location on the second selectable section that is distinct from the location that the cursor engaged the second selectable section; second select with the displayed cursor the second selectable symbol; display on the displayed user interface screen, along with at least part of the first graphical filter tool, a new graphic filtering tool representing a plurality of sub-electable sections representing a subset of filtering options from the second selectable section; second engage the displayed cursor with a first sub-electable section of the plurality of sub-electable sections;
in response to the second engage: alter display of the first sub-electable section to provide a second selectable symbol at a location on the first sub-electable section that is distinct from the location that the cursor engaged the first sub-electable section; display on the displayed user interface screen a description of a second filtering criteria represented by the first sub-electable section; second select with the displayed cursor the second selectable symbol; add, in response to the second select, the second filtering criteria to the filter list; filter the data set based on the filter list, the filter list including at least the first selectable section and the first sub-electable section;
presenting a selectable map icon in the search filter area to present the search results in a map view area, the map view area displaying a map of the search results; and update the search results area and the map view area of the user interface screen based on the filtered data set;
wherein each one of the plurality of graphical filter tools includes a ring shape filter tool surrounding a display field to display an angular dimension; and wherein the first altering display of the first selectable section provides the first selectable symbol on an arc portion of the first selectable section.

5. The system according to claim 4, wherein:
in response to the first engaging, the central processing unit is operative to update the user interface screen to include the number of the plurality of data items satisfying the filter criteria associated with the first selectable section.

6. A non-transitory computer readable medium containing instructions which when executed by a processor cause the processor to perform operations comprising:
displaying a user interface screen on a display device, the user interface screen including a search filter area and a search results area, the search filter area including a plurality of graphical filter tools, each one graphical filter tool of the plurality of graphical filter tools including a plurality of selectable sections, each one selectable section of the plurality of selectable sections being associated with a filter criteria for filtering a data set including a plurality of data items, each one selectable section of the plurality of selectable sections having a size indicative of a number of the plurality of data items satisfying the filter criteria associated with the one selectable section; first engaging a displayed cursor with a first selectable section of the plurality of selectable sections of a first graphical filter tool of the plurality of graphical filter tools; in response to the first engaging:
first altering display of the first selectable section to provide a first selectable symbol at a location on the first selectable section that is distinct from the location that the cursor engaged the first selectable section; and displaying on the displayed user interface screen a description of a first filtering criteria represented by the first selectable section; first selecting with the displayed cursor the first selectable symbol; adding, in response to the first selecting, the first filtering criteria to a filter list; second engaging the displayed cursor with a second selectable section of the plurality of selectable sections of a second graphical filter tool of the plurality of graphical filter tools; second altering, in response to the second engaging, display of second selectable section to provide a second selectable symbol at a location on the second selectable section that is distinct from the location that the cursor engaged the second selectable section; second selecting with the displayed cursor the second selectable symbol; displaying on the displayed user interface screen, along with at least part of the first graphical filter tool, a new graphic filtering tool representing a plurality of sub-electable sections representing a subset of filtering options from the second selectable section; second engaging the displayed cursor with a first sub-electable section of the plurality of sub-electable sections; in response to the second engaging: altering display of the first sub-electable section to provide a second selectable symbol at a location on the first sub-electable section that is distinct from the location that the cursor engaged the first sub-electable section; displaying on the displayed user interface screen a description of a second filtering criteria represented by the first sub-electable section; second selecting with the displayed cursor the second selectable symbol; adding, in response to the second selecting, the second filtering criteria to the filter list; filtering the data set based on the filter list, the filter list including at least the first selectable section and the first sub-electable section; presenting a selectable map icon in the search filter area to present the search results in a map view area, the map view area displaying a map of the search results; and updating the search results area and the map view area of the user interface screen based on the filtered data set; wherein each one of the plurality of graphical filter tools includes a ring shape filter tool surrounding a display field to display an angular dimension; and wherein the first altering display of the first selectable section provides the first selectable symbol on an arc portion of the first selectable section.

7. The medium according to claim 6, further comprising disposing in each one graphical filter tool of the plurality of graphical filter tools a size of a largest section of the plurality of selectable sections in the one graphical filter tool expressed as a percentage.

* * * * *